US012626248B2

(12) United States Patent
Wang

(10) Patent No.: US 12,626,248 B2
(45) Date of Patent: May 12, 2026

(54) METHOD FOR SIGNING APPLICATION, AND SERVICE PLATFORM

(71) Applicant: SHENZHEN ZOLON TECHNOLOGY CO., LTD., Shenzhen (CN)

(72) Inventor: Zhihao Wang, Shenzhen (CN)

(73) Assignee: SHENZHEN ZOLON TECHNOLOGY CO., LTD., Shenzhen (CN)

( * ) Notice: Subject to any disclaimer, the term of this patent is extended or adjusted under 35 U.S.C. 154(b) by 3 days.

(21) Appl. No.: 18/723,494

(22) PCT Filed: Oct. 18, 2022

(86) PCT No.: PCT/CN2022/125970
§ 371 (c)(1),
(2) Date: Jun. 24, 2024

(87) PCT Pub. No.: WO2023/124420
PCT Pub. Date: Jul. 6, 2023

(65) Prior Publication Data
US 2025/0053966 A1 Feb. 13, 2025

(30) Foreign Application Priority Data
Dec. 28, 2021 (CN) .......................... 202111633858.8

(51) Int. Cl.
*G06Q 20/02* (2012.01)
*G06F 8/61* (2018.01)
(Continued)

(52) U.S. Cl.
CPC ................................. *G06Q 20/3825* (2013.01)

(58) Field of Classification Search
CPC .... G06Q 20/3825; G06Q 20/02; G06Q 20/20; G06Q 20/3829; G06F 8/61; G06F 21/12; G06F 21/62; G06F 21/64
(Continued)

(56) References Cited

U.S. PATENT DOCUMENTS 9,489,524 B2 * 11/2016 Wurster ................... H04L 63/10
11,048,824 B2 * 6/2021 Jiang ...................... H04L 9/3263
(Continued)

FOREIGN PATENT DOCUMENTS

CN 103944903 7/2014

*Primary Examiner* — Clifford B Madamba
(74) *Attorney, Agent, or Firm* — ScienBiziP, P.C.

(57) ABSTRACT

The present application provides a method for signing an application, and a transaction terminal. The method includes receiving a download request that is sent by a transaction terminal, and the download request comprising an identification of an application to be installed, and determining an installation package of the application to be installed corresponding to the download request according to the identification, and obtaining signature data associated with the installation package and sending the installation package and the signature data to the transaction terminal, the installation package and the signature data indicating that the transaction terminal obtains a signed application package by combining the installation package and the signature data and installs the installation package after the signed application package is verified.

3 Claims, 4 Drawing Sheets

(51) Int. Cl.
*G06F 21/12*       (2013.01)
*G06F 21/62*       (2013.01)
*G06F 21/64*       (2013.01)
*G06Q 20/20*       (2012.01)
*G06Q 20/38*       (2012.01)

(58) Field of Classification Search
USPC .......................................................... 705/44
See application file for complete search history.

(56)                References Cited

U.S. PATENT DOCUMENTS

2017/0318030 A1*   11/2017   Liu ......................... G06F 21/51
2021/0091963 A1*   3/2021   Wu ....................... G06F 21/629

\* cited by examiner

METHOD FOR SIGNING APPLICATION, AND SERVICE PLATFORM

The present application claims the priority to Chinese patent application with application No. 202111633858.8, filed on Dec. 28, 2021, the content of the present application is incorporated herein by reference.

FIELD

The present application relates to a field of computer application technology, and specifically to a method for signing an application, and a service platform.

BACKGROUND

With development of Internet, use of a terminal device has become increasingly popular in all walks of life. In a field of payment transaction, in order to meet different needs of users, a transaction terminal can have multiple functions such as transaction, payment, industry applications, and social networking. Security and trustworthiness of an application software of the transaction terminal have become extremely important and requirements for controlling the security of the transaction terminal are getting higher and higher. Therefore, it is extremely important to ensure that the application software installed on the transaction terminal in various industries is safely and reliably.

BRIEF DESCRIPTION OF THE DRAWINGS

In order to more clearly illustrate technical solutions in the embodiments of the present application, the drawings required for use in the embodiments, or the description of prior art will be briefly introduced below. Obviously, drawings described below are only some embodiments of the present application. For ordinary technicians in this field, other drawings can be obtained based on the drawings without paying any creative labor.

DESCRIPTION

Figure 1:
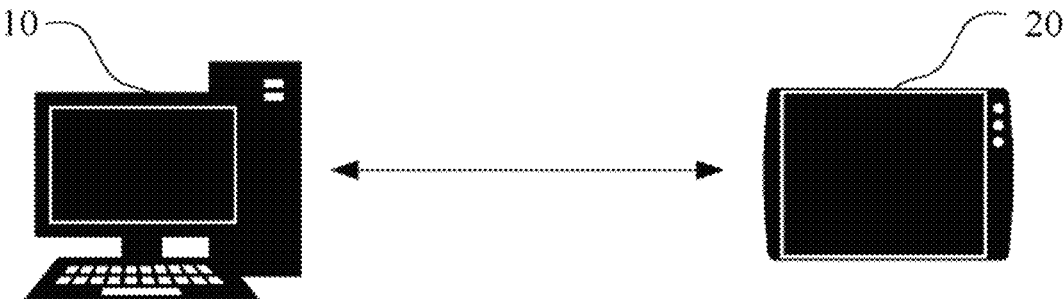
FIG. 1 is an architectural diagram of an application scenario of a system provided by an embodiment of the present application.

In following description, for a purpose of explanation rather than limitation, specific detail such as specific system structure and technology are provided to provide a thorough understanding of an embodiment of present application.

However, it will be apparent to those skilled in art that the present application may be practiced in other embodiments without the specific detail. In other instances, detailed description of well-known system, device, circuit, and method are omitted so as not to obscure the description of the present application with unnecessary detail.

It should be understood that when used in this specification and the appended claims, the term "comprising" indicates presence of described features, integers, steps, operations, elements and/or components, but does not exclude the presence or addition of one or more other features, integers, steps, operations, elements, elements and/or components thereof.

It will also be understood that a term "and/or" as used in the specification and the appended claims refers to and includes any and all possible combinations of one or more of the associated listed items.

As used in the specification and the appended claims of the present application, the term "if" can be interpreted as "when . . . " or "once" or "in response to determining" or "in response to detecting" depending on context. Similarly, a phrase "if it is determined" or "if it is detected [the described condition or event]" can be interpreted as meaning "once it is determined" or "in response to determining" or "once it is detected [the described condition or event]" or "in response to detecting [the described condition or event]" depending on the context.

In addition, in the description of the specification and the appended claims of the present application, the terms "first", "second", "third", etc. are only used to distinguish description and cannot be understood as indicating or implying relative importance.

The reference to "one embodiment" or "some embodiments" etc. described in the specification of the present application means that one or more embodiments of the present application include specific features, structures or characteristics described in conjunction with the embodiment. Therefore, the sentences "in one embodiment", "in some embodiments", "in some other embodiments", "in other embodiments", etc. appearing in different embodiments of the specification do not necessarily refer to the same embodiment, but mean "one or more but not all embodiments", unless otherwise specifically emphasized. The terms "include", "comprises", "has" and their variations all mean "including but not limited to", unless otherwise specifically emphasized.

At present, a platform used to provide application software based on web technology needs to ensure security of the application software when providing services such as uploading the application software, testing the application software, managing the application software, certifying the application software, and downloading the application software to prevent the application software from suffering static or dynamic attacks and improve safety performance of an interaction process of the system.

The embodiment of the application provides an application signing method. The application is signed online through the service platform, and then data is further packaged, combined and verified by the transaction terminal, thereby improving the security and reliability when the transaction terminal downloads and installs the application software.

Referring to FIG. 1, FIG. 1 provides an architectural diagram of an application scenario of a system. As shown in FIG. 1, the system may include a service platform 10 and a transaction terminal 20. Among them, the service platform 10 can obtain the application software uploaded by an application developer and manage attributes such as a type and a version of the application software. The transaction terminal 20 can download and install the application software that is required from the service platform 10. Through an interaction between the service platform 10 and the transaction terminal 20, safe and reliable downloading and installation of the application software is realized.

For example, the service platform can be a PAXSTORE platform, and the transaction terminal can be a POS.

In some embodiments, after receiving a download instruction or an upgrade instruction input by the user, the transaction terminal 20 can send a download request to the service platform 10, and the download request includes an identification of the application to be installed. After receiving the download request, the service platform 10 determines an installation package of the application to be installed corresponding to the download request based on the identification, and obtains signature data associated with the installation package, and sends the signature data and the installation package to the transaction terminal 20. After receiving the installation package and the signature data, the transaction terminal 20 assembles and packages the installation package again to obtain a signed application package and installs the installation package after passing a signature verification of the signed application package. It ensures the security of the application and its correspondence with the transaction terminal and avoids malicious downloading and installation by other terminals.

Based on above summary, a flowchart of an application signing method provided by the application will be described in detail below.

Figure 2:
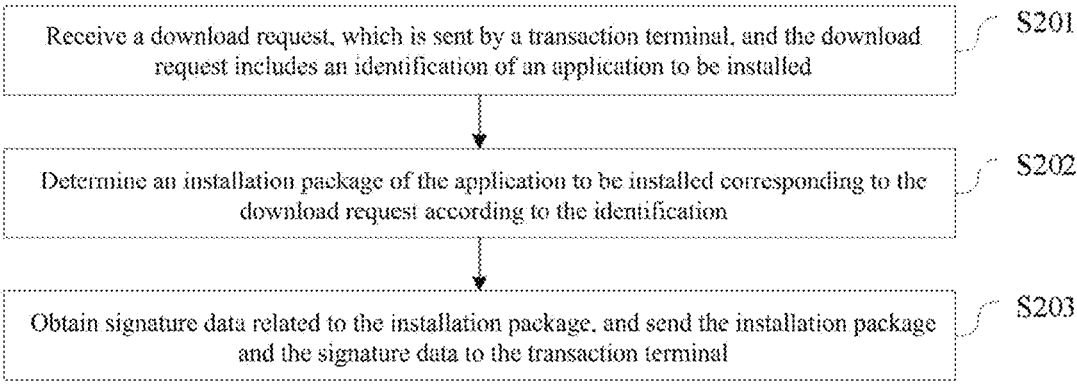
FIG. 2 is a schematic diagram of an implementation flowchart of an application signing method provided by an embodiment of the present application.

As shown in FIG. 2, it is the schematic diagram of the implementation flowchart of the application signing method provided by the embodiment of the present application. An execution subject of the method may be the service platform 10 of the system shown in FIG. 1. The method may include the following steps:

S201, a download request is received, which is sent by a transaction terminal, and the download request includes an identification of an application to be installed.

In some embodiments, the service platform recommends an application to the transaction terminal. When the service platform obtains a new application uploaded by a third-party developer or updates a version of an uploaded application, the service platform will notify recommend information of the new application or a new version of the application to the transaction terminal. When the transaction terminal needs to install the new application or the installed application needs to be upgraded, it can receive an instruction input by the user by clicking on a download control or an upgrade control. The transaction terminal sends the download request to the service platform based on the instruction.

For example, the download request may include the identification of the application to be installed. For example, the identification may be an application name of the application or a package name of the application package.

In some embodiments, the download request also includes agent information to which the transaction terminal belongs; after receiving the download request sent by the transaction terminal, the method further includes:

according to the agent information, a certificate of the agent is sent to the transaction terminal.

Among them, the certificate of the agent is obtained by signing a public key of the agent with a private key of a manufacturer, and the public key of the agent is generated by the service platform for the agent.

For example, the agent is an owner of the transaction terminal, that is, a party that sells the transaction terminal as an agent, and the service platform receives a registration of the agent. When a new agent is registered on the service platform, a signature of the application and a public key and a private key for verification will be generated for the agent.

For example, the service platform generates a pair of public key and private key for each agent who registered the service platform. Among them, the service platform signs the public key of the agent by using the private key of the manufacturer, and assembles it into a certificate of the agent, and sends the certificate of the agent to the transaction terminal represented by the agent and stores the private key of the agent in the service platform.

For example, the service platform can provide a unified application signature standard for transaction terminals of different manufacturers but can have different signature data for different manufacturers. The service platform can access transaction terminals produced by multiple manufacturers and can implement online signatures for applications from multiple manufacturers. For different manufacturers, the service platform obtains the signature data of the manufacturer based on the pair of the public key and the private key uploaded by the manufacturer and obtains an unlocking code (Personal Identification Number Unlocking Key, PUK) uploaded by the manufacturer. Among them, different manufacturers correspond to different signature data.

For example, the service platform receives the application uploaded by the application developer. Through the digital certificate authority (CA) service, the service platform generates the CA certificate of the application developer based on the public key of the application developer. When the service platform receives an application uploaded by an application developer through the developer center, the service platform automatically verifies the signature information of the application developer in the application package (APK) to check validity and legality of the CA certificate of the application developer.

For example, the service platform also provides an online signature service with a level of application market, and generates signature data for the application in the application market. For example, the signature data can be a code signing certificate PVK. The service platform sends the signature data to a client application of the transaction terminal. The signature data is used to instruct the transaction terminal to assemble the installation package of the application and the signature data.

S202, an installation package of the application to be installed corresponding to the download request is determined according to the identification.

In some embodiments, the service platform determines the installation package of the application to be installed corresponding to the download request based on the identification of the application to be installed in the download request.

Among them, the application to be installed may be an application that has not been installed in the transaction terminal or an installed application corresponding to a new version of the application to be upgraded.

For example, the service platform includes an installation package corresponding to an application developed by a third-party developer or an application in the application market. The installation package may be an installation package for a newly developed application, or may be an installation package for an upgraded version of an existing application. The service platform locates the installation package corresponding to the application to be installed based on the identifier of the download request, that is, the original package of the application.

S203, signature data related to the installation package is obtained, and the installation package and the signature data are sent to the transaction terminal.

Among them, the signature data and the installation package are used to instruct the transaction terminal to package and combine the installation package and the signature data to obtain a signed application package, and install the installation package after verifying the signed application package.

In some embodiments, when the application to be installed is uploaded to the service platform, the service platform has generated relevant signature data for the application. When the transaction terminal needs to download the application to be installed, the service platform generates the signature data of the application to be installed based on the transaction terminal corresponding to the download request. Therefore, the service platform will obtain all signature data related to the application to be installed and send all signature data to the transaction terminal corresponding to the download request.

In some embodiments, the signature data includes a signature file of the manufacturer and a signature file of the agent. Before obtaining the signature data related to the installation package, the method further includes:

signing the application to be installed by using the private key of the manufacturer based on the identification of the application to be installed and generating the signature file of the manufacturer associated with the application to be installed and signing the application to be installed by using the private key of the agent based on the agent information of the download request, and generating the signature file of the agent associated with the application to be installed.

For example, after receiving the uploaded application, the service platform reviews the application package of the application and verifies the signature information of the application developer in the application package. After passing the review and the verification, the service platform uses the previously stored private key of the manufacturer to sign the application package (or the installation package) and generates signature file S1 of the manufacturer. The signature file of the manufacturer is used to verify the signature of the manufacturer, so that a machine (transaction terminal) of the manufacturer cannot install other applications arbitrarily. The application must include the private key signature of the manufacturer before being installed. Each transaction terminal comes out of the factory with its own certificate of the manufacturer.

For example, when the service platform receives the download request and determines the installation package of the application to be installed, it can also determine the agent to which the transaction terminal belongs based on the agent information of the download request. The service platform signs the application package online based on the stored private key of the agent corresponding to the agent and generates signature file S2 of the agent. The signature file of the agent ensures that different agents cannot install applications with each other. If different agents use machines from the same manufacturer, if there is only the signature file of the manufacturer, there is no guarantee that applications between different agents cannot be installed with each other. This can improve the security and reliability of applications that are installed between different agents.

In some embodiments, the service platform needs to maintain original installation package (or application package) of each application to be installed, as well as different signature data, and can dynamically switch the signature data at any time.

For example, the service platform can receive the signature data of the custom signature input by an administrator of the web page through the general settings, or the signature data input by the global signature mechanism.

Figure 3:
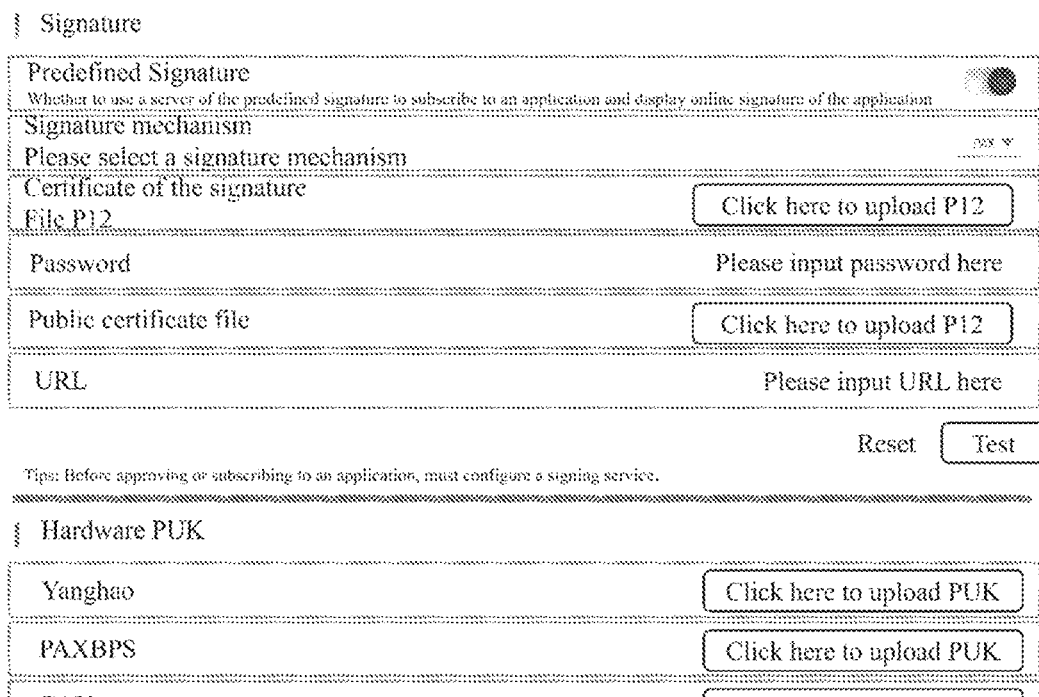
FIG. 3 is a schematic diagram of an interface for generating signature data by a service platform provided by an embodiment of the present application.

Among them, the service platform needs to receive the Public-Key Cryptography Standards12 (P12) file uploaded by the administrator based on the signature mechanism of the custom signature, as shown in the schematic diagram of the display interface of the service platform in FIG. 3. As shown in FIG. 3, after starting a custom signature mode, the service platform selects a signature mechanism, such as a signature server corresponding to PAX. In the custom signature mode, the service platform can receive the signature certificate P12 file; since the P12 file is a personal key, a password is required to open the file, so the interface also includes a control for entering the password of the P12 file.

For example, the Uniform Resource Locator (URL) of the remote API invoked by the signature server corresponding to PAX when signing. Among them, the public certificate file of the signature server can be used to authenticate the signature server, and the certificate can be uploaded selectively.

For example, the display interface of the service platform also includes an upload control for the unlocking password PUK corresponding to the personal identification code corresponding to each manufacturer, such as the PUK code used by manufacturers such as Yanghao, PAXBPS, and PAX. After receiving the PUK code corresponding to the manufacturer, the service platform verifies legality of the PUK code.

It should be noted that before the service platform approves or allows the administrator to subscribe to the application, it is necessary to configure the signature service based on a prompt control of the display interface of the service platform. After receiving the above configuration information, the service platform implements the signature mechanism for the uploaded applications online based on the configuration information.

In addition, after the service platform receives an instruction to change the signature entered by the administrator based on the general settings (for example, a change instruction received through a reset control of the interface in FIG. 3), it can regenerate the signature data, and the corresponding market program file (such as AndroidPackage) is re-signed and the application is signed online asynchronously. It should be noted that the service platform also has a whitelist mechanism for uploaded applications. When the signature data is changed, applications of the whitelist will not be signed.

Figure 4:
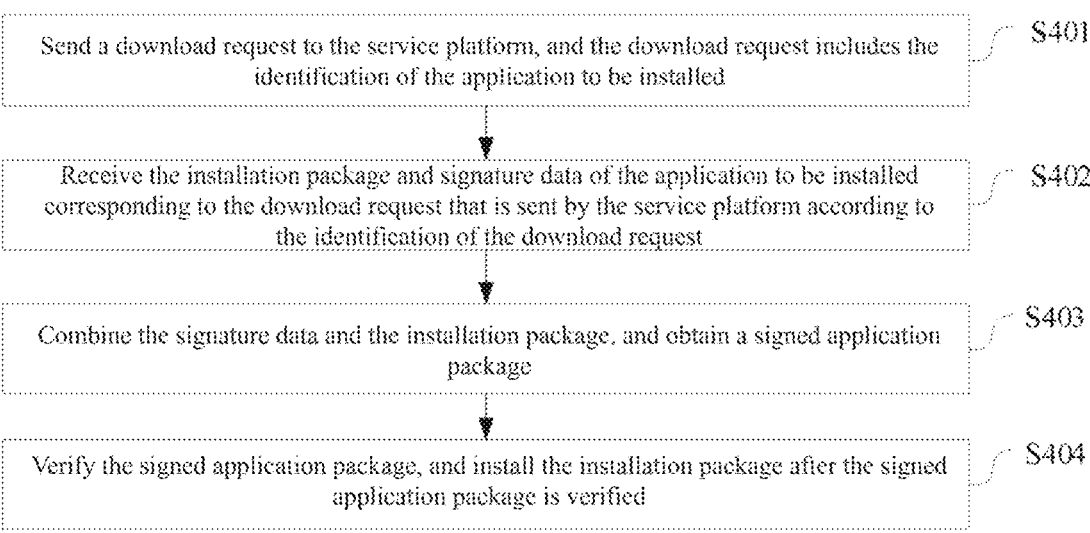
FIG. 4 is a schematic diagram of an implementation flowchart of a method for signing an application provided by an embodiment of the present application.

As shown in FIG. 4, it is a schematic flowchart of the implementation of the method for signing application provided by the embodiment of the present application. The method execution subject may be the transaction terminal 20 of the system shown in FIG. 1. The parts of the method that are the same as those in the above embodiment will not be described again. As shown in FIG. 4, the method may include the following steps:

S401, a download request is sent to the service platform, and the download request includes the identification of the application to be installed.

In some embodiments, when the transaction terminal needs to install the new application or the installed application needs to be upgraded, it can receive an instruction input by the user by clicking on a download control or an upgrade control. The transaction terminal sends the download request to the service platform based on the instruction.

For example, the transaction terminal can provide a client application for a user to login. After receiving the installation or upgrade instructions input by the user based on the client application, the transaction terminal can run the client application, and manage applications of the transaction terminal, such as interacting with the service platform, downloading the application to be installed, etc.

In some embodiments, the download request also includes agent information to which the transaction terminal belongs, after sending the download request to the service platform, the method further includes receiving the certificate of the agent sent by the service platform according to the agent information.

Among them, the certificate of the agent is obtained by signing a public key of the agent with a private key of a manufacturer, and the public key of the agent is generated by the service platform for the agent.

For example, the service platform generates a pair of private key and public key corresponding to the agent for each agent, uses the private key of the manufacturer to sign the public key, and obtains the certificate of the agent. And the transaction terminal receives the certificate of the agent sent by the service platform.

S402, the installation package and signature data of the application to be installed corresponding to the download request that is sent by the service platform are received according to the identification of the download request.

In some embodiments, the transaction terminal can receive all signature data related to the application to be installed sent by the service platform.

S403, the signature data and the installation package are combined, and a signed application package is obtained.

S404, the signed application package is verified, and the installation package is installed after the signed application package is verified.

In some embodiments, the signature data includes a signature file of the manufacturer and a signature file of the agent. The signed application package is verified includes: verifying the signature file of the manufacturer by using the certificate of the manufacturer and determining that the installation package includes the signature of the manufacturer if the verification of the signature file of the manufacturer signature is passed; verifying the certificate of the agent by using the certificate of the manufacturer that is verified and determining that the certificate of the agent is obtained by signing the private key of the manufacturer; verifying the signature file of the agent by using the certificate of the agent that is verified and determining that the signature file of the agent is obtained by signing the private key of the agent.

For example, when the transaction terminal downloads the application, it will obtain the original package of the application, the signature file of the manufacturer S1 and the signature file of the agent S2 provided by the service platform. After obtaining these three files, the transaction terminal will generate a signed application package by re-packaging the three files. Then, the transaction terminal verifies the S1 through the certificate of the manufacturer to ensure that the application includes the signature of the private key of the manufacturer. The transaction terminal contains a certificate of the manufacturer, and the certificate of the agent is verified through the certificate of the manufacturer to ensure that the certificate of the agent is signed by the private key of the manufacturer. The transaction terminal uses the certificate of the agent to verify the S2 to ensure that the S2 is signed by the private key of the agent. After all verifications are completed, it can be ensured that the application to be installed can be installed and cannot be installed on the transaction terminal of other agents.

Figure 5:
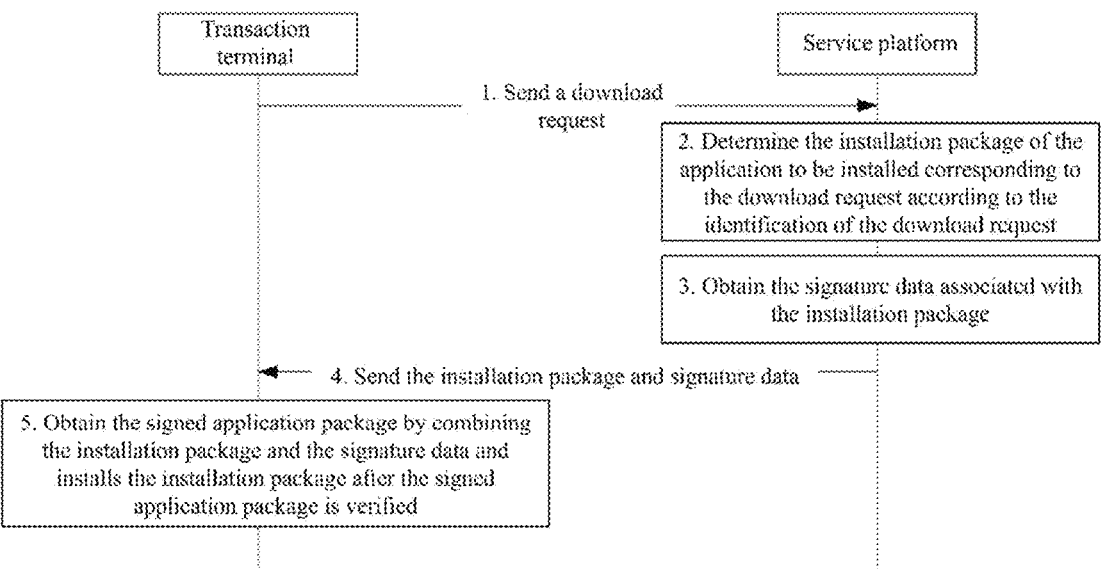
FIG. 5 is a schematic diagram of an interface flowchart of a method for signing an application provided by an embodiment of the present application.

As shown in the FIG. 5, it is a schematic diagram of an interface flowchart of a method for signing application provided by an embodiment of the present application. The principle of an implementation process is the same as that of the above embodiment and will not be described again here.

As shown in FIG. 5, the schematic diagram of an interface flowchart may include the following steps:
1. the transaction terminal sends a download request to the service platform;
2. the service platform determines the installation package of the application to be installed corresponding to the download request according to the identification of the download request;
3. the service platform obtains the signature data associated with the installation package;
4. the service platform sends the installation package and signature data to the transaction terminal;
5. the transaction terminal obtains the signed application package by combining the installation package and the signature data and installs the installation package after the signed application package is verified.

Through the embodiments of the application, it is possible to break the shackles that the original transaction status only belongs to business logic of the payment application itself and is invisible to other applications, so that the transaction status of the payment application can be disclosed to the client that manages the transaction terminal before the application is upgraded. Traditional application management platform does not consider whether the application is in an idle state when upgrading application, so a loss of transaction data due to upgrades can be avoided.

It should be understood that a serial number of each step in the above embodiment does not mean an order of execution. The execution order of each process should be determined by its function and internal logic and should not constitute any limitation on the implementation process of the embodiment of the present application.

Corresponding to the method for signing the application described in the above embodiment, the embodiment of the present application provides an apparatus for signing the application. For convenience of explanation, only the parts related to the embodiment of the present application are described.

The apparatus includes:

A receiving unit, configured to receive a download request sent by the transaction terminal, where the download request includes an identification of the application to be installed.

A processing unit configured to an installation package of the application to be installed corresponding to the download request according to the identification.

A signing unit configured to obtain signature data related to the installation package, and send the installation package and the signature data to the transaction terminal.

Among them, the signature data and the installation package are used to instruct the transaction terminal to package and combine the installation package and the signature data to obtain a signed application package, and install the installation package after verifying the signed application package.

Corresponding to the method for signing the application in the above embodiment, the apparatus for signing the application is provided by the embodiment of the present application, for convenience of explanation, only the parts related to the embodiment of the present application are described.

The apparatus includes:

A sending unit, used to send a download request to the service platform, and the download request includes the identification of the application to be installed.

A receiving unit configured to receive the installation package and signature data of the application to be installed corresponding to the download request that is sent by the service platform are received according to the identification of the download request.

A processing unit, used to combine the signature data and the installation package and obtain a signed application package.

A verifying unit is used to verify the signed application package and install the installation package after the signed application package is verified.

It should be noted that information interaction, execution process, etc. between the above-mentioned devices/units are based on the same concept as the method embodiment of the present application. Their specific functions and technical effects can be found in the method embodiment part and will not be repeated here.

Those skilled in the art can clearly understand that for the convenience and simplicity of description, only the division of the above-mentioned functional units and modules is used as an example. In practical applications, the above-mentioned functions can be allocated by different modules as needed. Functional units and modules are completed, that is, the internal structure of the device is divided into different functional units or modules to complete all or part of the functions described above. Each functional unit and module in the embodiment can be integrated into one processing unit, or each unit can exist physically alone, or two or more units can be integrated into one unit. The above-mentioned integrated unit can be hardware-based. It can also be implemented in the form of software functional units. In addition, the specific name of each functional unit and module is only for the convenience of distinguishing each other and is not used to limit the scope of protection of the present application. For the specific working processes of the units and modules in the above system, reference can be made to the corresponding processes in the foregoing method embodiments, which will not be described again here.

The embodiment of this application also provides a system for signing an application, which includes a service platform and a transaction terminal.

The transaction terminal is configured to send a download request to the service platform, where the download request includes the identification of the application to be installed.

The service platform is configured to receive the download request and determine the installation package of the application to be installed corresponding to the download request according to the identification.

The service platform is also configured to obtain the signature data associated with the installation package, and send the installation package and the signature data to the transaction terminal.

The transaction terminal is also configured to receive the installation package and the signature data, combine the installation package and the signature data and obtain a signed application package, and install the installation package after the signed application package is verified.

The embodiments of the present application also provide a computer-readable storage medium, the computer-readable storage medium stores a computer program, and when the computer program is executed by a processor, the steps in each of the above method embodiments can be realized.

Embodiments of the present application provide a computer program product. When the computer program product is run on a mobile terminal, the steps in each of the above method embodiments can be implemented when the mobile terminal is executed.

Figure 6:
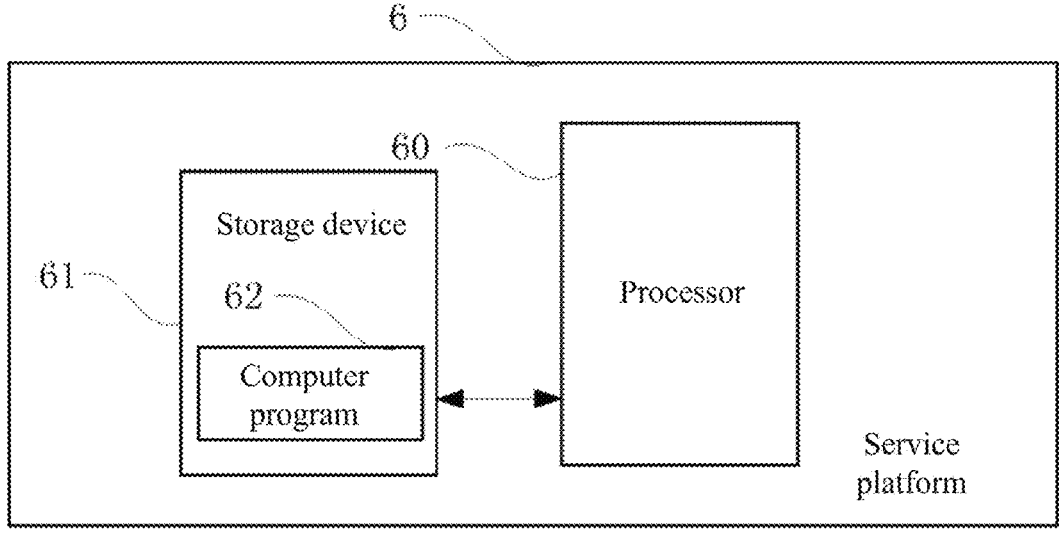
FIG. 6 is a schematic diagram of a structural of a service platform provided by an embodiment of the present application.

FIG. 6 is a schematic structural diagram of the service platform 6 provided by an embodiment of the present application. As shown in FIG. 6, the service platform 6 of this embodiment includes: at least one processor 60 (only one is shown in FIG. 6), a storage device 61, and a computer program 62 stored in the storage device 61 and executable on the at least one processor 60. When the processor 60 executes the computer program 62, the steps in the above embodiment are implemented.

The service platform 6 can be a computing device such as a desktop computer, a notebook, a PDA, a cloud server, etc. The service platform 6 may include, but is not limited to, a processor 60 and a storage device 61. Those skilled in the art can understand that FIG. 6 is only an example of the service platform 6 and does not a limitation of the service platform 6. It may include more or fewer components than shown in the figure, or some components may be combined, or different components may be used. For example, it may also include input and output devices, network access devices, etc.

The processor 60 can be a central processing unit (CPU). The processor 60 can also be other general-purpose processors, digital signal processors (DSP), application specific integrated circuits (ASIC), off-the-shelf programmable gate array (FPGA) or other programmable logic devices, discrete gate or transistor logic devices, discrete hardware components, etc. A general-purpose processor may be a microprocessor, or the processor may be any conventional processor, etc.

The storage device 61 may be an internal storage unit of the service platform 6 in some embodiments, such as a hard disk or memory of the service platform 6. In other embodiments, the storage device 61 may also be an external storage device of the service platform 6, such as a plug-in hard disk, a smart media card (SMC), a secure digital (SD) card, a flash card, etc. equipped on the service platform 6. Further, the storage device 61 may also include both an internal storage unit and an external storage device of the service platform 6. The storage device 61 is used to store an operating system, an application program, a boot loader (BootLoader), data, and other programs, such as the program code of the computer program. The storage device 61 may also be used to temporarily store data that has been output or is to be output.

Figure 7:
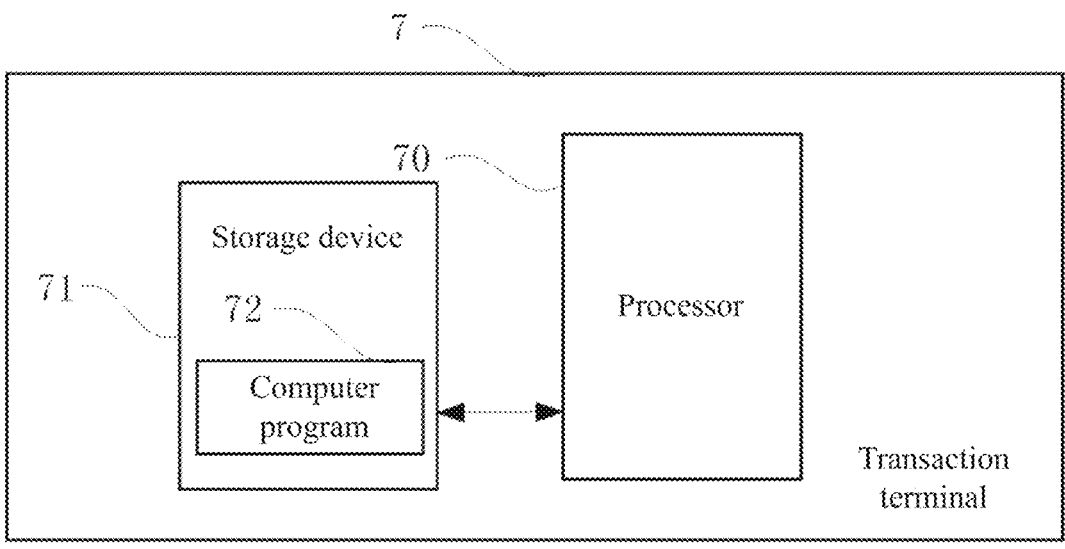
FIG. 7 is a schematic diagram of a structural of a transaction terminal provided by an embodiment of the present application.

FIG. 7 is a schematic structural diagram of a transaction terminal 7 provided by an embodiment of the present application. As shown in FIG. 7, the transaction terminal 7 of this embodiment includes: at least one processor 70 (only one is shown in FIG. 7), a storage device 71 and a computer program 72 stored in the storage device 71 and executable on the at least one processor 70. When the processor 70 executes the computer program 72, the steps in the above embodiment are implemented.

If the integrated unit is implemented in the form of a software functional unit and sold or used as an independent product, it can be stored in a computer-readable storage medium. Based on this understanding, the present application implements all or part of the processes in the above-mentioned embodiment method, which can be completed by instructing the relevant hardware through a computer program. The computer program can be stored in a computer-readable storage medium, and the computer program can implement the steps of the above-mentioned various method embodiments when executed by the processor. Among them, the computer program includes computer program code, and the computer program code can be in a form of source code, a form of object code, a form of executable file or a form of intermediate. The computer-readable medium can at least include any entity or device that can carry the computer program code to the camera/terminal device, recording medium, computer memory, read-only memory (ROM), random access memory (RAM), electric carrier signal, telecommunication signal and software distribution medium. For example, a USB flash drive, a mobile hard disk, a magnetic disk or an optical disk. In some jurisdictions, according to legislation and patent practice, computer-readable media cannot be electric carrier signals and telecommunication signals.

In the above embodiments, each embodiment has its own emphasis in the description. For parts that are not detailed or recorded in a certain embodiment, please refer to the relevant descriptions of other embodiments.

Those of ordinary skill in the art will appreciate that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Professional and technical personnel can use different methods to implement the described functions for each specific application, but such implementation should not be considered to be beyond the scope of this application.

In the embodiments provided in the present application, it should be understood that the disclosed devices/network equipment and methods can be implemented in other ways. For example, the device/network equipment embodiments described above are merely schematic. For example, the division of the modules or units is only a logical function division. There may be other division methods in actual implementation, such as multiple units or components can be combined or integrated into another system, or some features can be ignored or not executed. Another point is that the mutual coupling or direct coupling or communication connection shown or discussed can be through some interfaces, indirect coupling or communication connection of devices or units, which can be electrical, mechanical or other forms.

The units described as separate components may or may not be physically separated, and the components shown as units may or may not be physical units. That is, they may be located in one place, or they may be distributed to multiple network units. Some or all of the units can be selected according to actual needs to achieve the purpose of the solution of this embodiment.

The above-described embodiments are only used to illustrate the technical solutions of the present application, but not to limit them. Although the present application has been described in detail with reference to the foregoing embodiments, those of ordinary skill in the art should understand that they can still implement the above-mentioned implementations. The technical solutions described in the examples are modified, or some of the technical features are equivalently replaced. And these modifications or substitutions do not cause an essence of the corresponding technical solutions to deviate from the spirit and scope of the technical solutions in the embodiments of this application, and should be included in within the protection scope of this application.

What is claimed is:

1. A method for signing an application, applied in a service platform, the service platform is communicatively connected with a transaction terminal, the method comprising:

receiving a download request that is sent by the transaction terminal, and the download request comprising an identification of an application to be installed and agent information belongs to the transaction terminal;

sending a certificate of an agent to the transaction terminal according to the agent information, wherein the certificate of the agent is obtained by signing a public key of the agent through a private key of a manufacturer, and the public key of the agent is generated by the service platform for the agent;

determining an installation package of the application to be installed corresponding to the download request according to the identification;

signing the application to be installed with the private key of the manufacturer according to the identification of the application to be installed and generating the signature file of the manufacturer that is associated with the application to be installed;

signing the application to be installed with a private key of the agent according to the agent information of the download request and generating the signature file of the agent that is associated with the application to be installed;

obtaining signature data associated with the installation package and sending the installation package and the signature data to the transaction terminal, the installation package and the signature data indicating that the transaction terminal obtains a signed application package by combining the installation package and the signature data and installs the installation package after the signed application package is verified, the signature data comprises the signature file of the manufacturer and the signature file of the agent.

2. A method for signing an application, applied in a transaction terminal, the transaction terminal is communicatively connected with a service platform, the method comprising:

sending a download request to the service platform, and the download request comprising an identification of an application to be installed and agent information belongs to the transaction terminal;

receiving a certificate of an agent sent by a service platform according to the agent information, wherein the certificate of the agent is obtained by signing a public key of the agent through a private key of a manufacturer, and the public key of the agent is generated by the service platform for the agent;

receiving an installation package and signature data of the application to be installed corresponding to the download request, which is sent by the service platform according to the identification of the download request, wherein the signature data comprises a signature file of the manufacturer and a signature file of the agent;

combining the signature data and the installation package and obtaining a signed application package;

verifying the signed application package and installing the installation package after the signed application package is verified, wherein the verifying the signed application package comprises:

verifying the signature file of the manufacturer by using a certificate of the manufacturer and determining that the installation package comprises the signature of the manufacturer in response to a verification of the signature file of the manufacturer being passed;

verifying the certificate of the agent by using the certificate of the manufacturer and determining that the certificate of the agent is obtained by signing the private key of the manufacturer in response to a verification of the certificate of the agent being passed;

verifying the signature file of the agent by using a verified certificate of the agent and determining that the signature file of the agent is obtained by signing the private key of the agent in response to a verification of the signature file of the agent being passed.

3. A service platform, wherein the service platform comprises a storage device, a processor, and a computer program stored in the storage device and executable on the processor, the processor is caused to:

receive a download request that is sent by a transaction terminal, and the download request comprises an identification of an application to be installed and agent information belongs to the transaction terminal;

send a certificate of the agent to the transaction terminal according to the agent information, wherein the certificate of the agent is obtained by signing a public key of the agent through a private key of the manufacturer, and the public key of the agent is generated by the service platform for the agent;

determine an installation package of the application to be installed corresponding to the download request according to the identification;

sign the application to be installed with the private key of the manufacturer according to the identification of the application to be installed and generate the signature file of the manufacturer that is associated with the application to be installed;

sign the application to be installed with a private key of the agent according to the agent information of the download request and generate the signature file of the agent that is associated with the application to be installed;

obtain signature data associated with the installation package and send the installation package and the signature data to the transaction terminal, the installation package and the signature data indicating that the transaction terminal obtains a signed application package by combining the installation package and the signature data and installs the installation package after the signed application package is verified, the signature data comprises the signature file of the manufacturer and the signature file of the agent.

* * * * *